May 1, 1928. 1,667,876
M. STEINER
INSECT TRAP
Filed Dec. 2, 1925
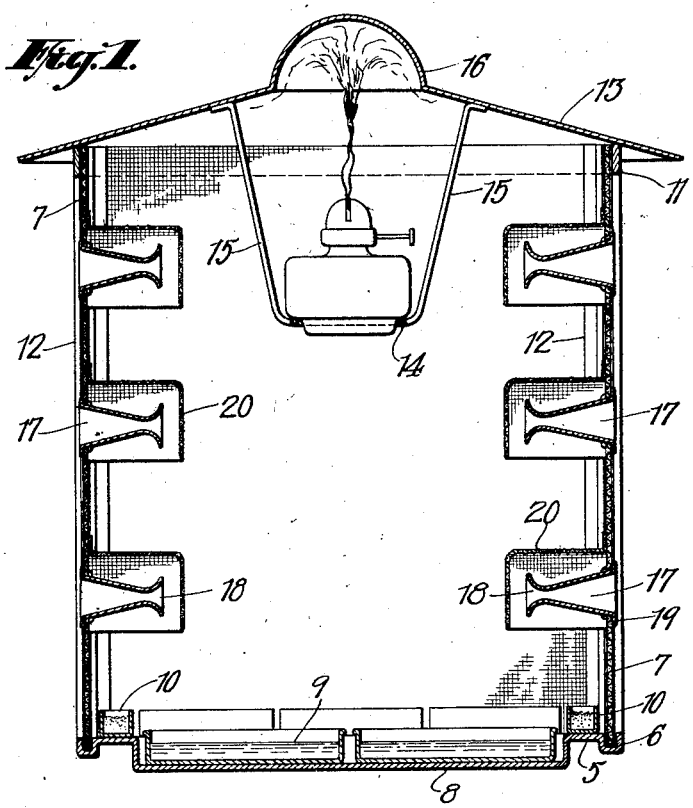
INVENTOR.
MARTIN STEINER.
BY
*Richard L. Owen*
ATTORNEY.

Patented May 1, 1928.

1,667,876

UNITED STATES PATENT OFFICE.

MARTIN STEINER, OF KENILWORTH, NEW JERSEY.

INSECT TRAP.

Application filed December 2, 1925. Serial No. 72,739.

This invention relates to insect traps and in particular to one so formed that when an insect has entered the same, it will be imprisoned therein.

A particular object of the invention is to so design a trap that the bait used will be a source of light or food which has attracting qualities.

A further object of the invention is to provide entrances to such a trap so arranged that insects can easily find their way in but will be unable to find their way out after entering the trap, and also to provide a heat chamber in the trap in the nature of a cupola-shaped dome which is disposed directly over a light and into which the insects will fly so that they will be burned and drop into the receptacles formed in the trap which contains poison.

A further object of the invention is to provide in a trap of this nature, a series of poison gas containing trays which will emit an odorless gas poison which will be detrimental to insects and harmless to human beings.

A further object of the invention is to provide an insect trap which can be used indoors or in the field and which, through the medium of its bright light will attract thereto field insects, flies and the like and so collect them that it will be impossible for them to get out of the trap once they have entered the same.

Referring to the drawings wherein I have shown a preferred embodiment of my invention, Figure 1 is a cross-sectional view in elevation showing the funnel-like entrances to the trap and also the disposition of the light and poison pans in the trap.

Figure 2 is a view in elevation of the outside of the trap showing the location of the entrance funnels which are incorporated in the side walls of the trap, and Figure 3 is a section taken on the line 3—3 of Figure 2 and shows the arrangement of the poison gas pans and also the nested arrangement of the liquid poison pans which are disposed on the floor of the trap.

Referring to the drawings in detail 5 indicates the base or bottom portion of the metallic frame, the edges of which are grooved as at 6 to receive the lower end of the screen 7, which forms the sides of the trap. The central part of the frame 5 is depressed as at 8 to receive a plurality of nested pans 9 in which is held the liquid poison into which the insects fall after they have been overcome by the poison gas or the heat of the lamp or light.

Adjacent the outer edges of the bottom portion of the frame or floor, I provide a series of poison gas pans 10, these pans may be designated as poison gas shelves and may be made in sections so that they can be removed or taken apart for the purposes of cleaning and renewing the mixture contained therein, which generates the gas and which usually consists of about an inch of wet sand on top of which is provided a light sprinkling of granulated paradi chloro-benzene, which is covered with another inch of wet sand, this combination generating a poison gas in the trap, which is detrimental to insect life but which is harmless to human beings. Connecting the corners of the bottom portion 5 of the trap with an upper frame member 11, are the spaced angle members 12, the spaces therebetween providing slots in which may be dropped the screen sides 7 of the frame, these screen sides are made of fine mesh wire through which the light from the lamp can easily be seen. The light is supported from the roof 13 of the trap.

The lamp, which may be made of any suitable type and which I have shown as an oil lamp, it being of course understood that an electric light or any other suitable light could just as well be used, is supported in spaced relation to the roof through the medium of the ring member 14, which is connected to the roof by the hangers 15, the lamp suitably resting in said ring member 14, so that its flame will give a steady light, which will be seen through the sides of the trap and the heat from which will be imprisoned or directed toward a cupola light chamber 16 formed in the center of the roof 13, the roof itself being of solid sheet metal and resting on the upper frame piece 11.

It will be evident that when the roof 13 has been removed, the side screens 7 can be slipped up through the slot, formed between the angle pieces 12, disposed at the corners of the trap. The side walls on 1, 2 or all sides of the trap are provided with entrances which are made up of sheet metal funnels 17 having their inner ends flared as at 18 and being held through the medium of suitable flanges 19 to the screen 7. It is evident that the restricted end of these funnels being disposed inside the trap will be difficult for an insect to find, once he has flown therethrough and entered the trap and with a view to hiding the inner end of these funnels, I provide a housing 20, made of fine wire mesh for the inner end of said funnel entrances, the housing being open at the bottom and being slightly spaced from the inner end of the funnels 17, so that when an insect flies through the funnel entrances, it will endeavor to get out of the housing 20 and will fly into the main chamber of the trap and then will be unable to find the way out of the trap.

If desired, I may use in place of the pan 9, fly paper or similar device which will hold a fly or insect that alights thereon and also I may smear the outside portions of the funnels 17 with some heavy gum substance which will hold an insect which alights thereon. It is evident therefore, that I have provided a labyrinthian trap, the entrances of which are so constructed that insects can easily find their way into the trap but will be unable to find their way out after entering. Also I have provided a heat chamber which is designed to gather and keep the heat of the light so that when the insects fly above the lamp into the heat chamber, they will be overcome and will fall into the poison trays which are disposed on the floor of the trap. Also, I have provided removable sides for such a trap whereby the same can readily be cleaned and the poison, liquid or gas, renewed, and also, I have provided a trap which is fireproof and in which can be incorporated a light, sufficiently bright to attract insects either in the house or out in the fields and one which will kill or overcome the insects, thus doing away with the same.

It is to be understood that changes in the construction and arrangement of the parts may be made without departing from the scope of the appended claim.

Having described my invention what I claim is:—

An insect trap comprising a bottom floor piece, corner members providing slots supported on said bottom floor piece, sides made up of wire mesh removably held in said slots, removable roof for said trap supported by said corner members and having a dome formed therein, a light in the trap, suspended from the roof, the heat from which is collected by said dome and a series of solid walled funnels having constricted portions in said trap side, the entrance orifices of which are substantially larger than the exit orifices thereof whereby the insect upon entering the trap will have difficulty in finding said exit orifices, transparent housing over each of said funnel members and means for generating a poison gas disposed in said trap.

In testimony whereof I affix my signature.

MARTIN STEINER. [L. S.]